(12) United States Patent
Okamoto et al.

(10) Patent No.: US 8,722,181 B2
(45) Date of Patent: May 13, 2014

(54) RESIN COMPOSITION AND MULTILAYER STRUCTURE USING THE SAME

(75) Inventors: Shinji Okamoto, Osaka (JP); Kouji Yamada, Osaka (JP)

(73) Assignee: The Nippon Synthetic Chemical Industry Co., Ltd., Osaka (JP)

( * ) Notice: Subject to any disclaimer, the term of this patent is extended or adjusted under 35 U.S.C. 154(b) by 691 days.

(21) Appl. No.: 12/866,743

(22) PCT Filed: Apr. 10, 2009

(86) PCT No.: PCT/JP2009/057403
§ 371 (c)(1),
(2), (4) Date: Aug. 9, 2010

(87) PCT Pub. No.: WO2009/128411
PCT Pub. Date: Oct. 22, 2009

(65) Prior Publication Data
US 2011/0020626 A1    Jan. 27, 2011

(30) Foreign Application Priority Data

Apr. 14, 2008  (JP) .................................. 2008-104408
Apr. 17, 2008  (JP) .................................. 2008-107727

(51) Int. Cl.
*C08L 29/04*    (2006.01)

(52) U.S. Cl.
USPC ........ 428/220; 428/475.2; 428/515; 428/516; 525/57

(58) Field of Classification Search
USPC .................. 428/220, 515, 516, 475.2; 525/57
See application file for complete search history.

(56) References Cited

U.S. PATENT DOCUMENTS

| | | | |
|---|---|---|---|
| 8,163,832 B2 * | 4/2012 | Shibutani et al. | 524/503 |
| 2007/0042206 A1 * | 2/2007 | Niwa | 428/473.5 |
| 2007/0196679 A1 | 8/2007 | Moriyama et al. | |
| 2009/0023880 A1 | 1/2009 | Shibutani | |
| 2009/0186233 A1 | 7/2009 | Masumoto et al. | |
| 2010/0136354 A1 * | 6/2010 | Taniguchi et al. | 428/500 |

FOREIGN PATENT DOCUMENTS

| | | |
|---|---|---|
| CN | 101027356 | 8/2007 |
| JP | 63-114645 | 5/1988 |
| JP | 8-311276 | 11/1996 |
| JP | 2002-69320 | 3/2002 |
| JP | 2002-105269 | 4/2002 |
| JP | 2002-284818 | 10/2002 |
| JP | 2003-54592 | 2/2003 |
| JP | 2006-52351 | 2/2006 |
| JP | 2006-89538 | 4/2006 |
| JP | 2006-95825 | 4/2006 |
| JP | 2006-124668 | 5/2006 |
| JP | 2006-312313 | 11/2006 |
| JP | 2007-261075 | 10/2007 |
| JP | WO2007/129370 | * 11/2007 |
| JP | 2007-261074 | 12/2007 |
| JP | 2008-50574 | 3/2008 |
| JP | WO2008/139863 | * 11/2008 |
| WO | 2004/113071 | 12/2004 |

OTHER PUBLICATIONS

Machine Translation of JP 2002-069320.*
Machine Translation of JP 2006-312313.*
Search report from E.P.O. that issued with respect to patent family member European Patent Application No. 09732375.2, mail date is May 10, 2011.
International Search Report for PCT/JP2009/057403, mailed Jun. 16, 2009.
Partial English language translation of JP 63-114645, May 19, 1988.

* cited by examiner

*Primary Examiner* — Maria Veronica Ewald
*Assistant Examiner* — Brian Handville
(74) *Attorney, Agent, or Firm* — Greenblum & Bernstein, P.L.C.

(57) ABSTRACT

The present invention provides a resin composition of a saponified ethylene-vinyl ester copolymer can provide a molded product including layer of the resin composition with less thickness variation and excellent gas-barrier properties, even if the layer is subjected to stretch forming such as deep drawing forming and vacuum-pressure forming where the layer is applied with different tension from side to side thereof in short time. The resin composition comprises an EVOH resin having ethylene content of 20 to 60 mol % and a PVA having 1,2-diol structural unit in a side chain. The present invention also provides a multilayer structure using the resin composition.

16 Claims, No Drawings

RESIN COMPOSITION AND MULTILAYER STRUCTURE USING THE SAME

TECHNICAL FIELD

The present invention relates to a resin composition (EVOH resin composition) of a saponified ethylene-vinyl ester copolymer having improved stretchability, and more particularly to an EVOH resin composition for use in a multilayer structure suitable for forming a molded product produced by stretching, such as films, sheets, bottles, cups, and tubes, particularly, bottles and cups.

BACKGROUND ART

A saponified ethylene-vinyl ester copolymer (hereinafter, also called as "EVOH resin") has superior gas-barrier properties, similarly to polyvinyl alcohol (hereinafter, also called as "PVA") obtained by saponification of polyvinyl ester. Whereas PVA is water-soluble and a PVA film cannot be produced by melt-forming because the melting point of PVA is close to the decomposition point thereof, EVOH resin is water-insoluble and an EVOH resin film can be produced by melt-forming, because a difference between the melting point and the decomposition point of EVOH resin is large. In view of the above, EVOH resin is widely used for various packaging materials such as food packaging materials and medical packaging materials. An EVOH resin film may be used alone. However, because the gas-barrier properties and film strength of the EVOH resin film may be degraded resulting from moisture absorbing, the EVOH resin film is normally used as a multilayer structure, wherein an outer surface layer is constituted of e.g. a thermoplastic resin film having less water permeability.

A multilayer structure such as a sheet may preferably be stretched to increase the strength thereof. Stretching an EVOH resin layer enables to enhance the gas-barrier properties, because the molecular chains are aligned in a high density state by stretching. In view of this, the multilayer structure is normally stretched for use.

The stretchability of the EVOH resin layer is poor, as compared with that of a thermoplastic resin layer. Accordingly, in stretching a multilayer structure including an EVOH resin layer by e.g. uniaxial stretching or biaxial stretching, it is difficult to evenly stretch the EVOH resin layer, and stretching the EVOH resin layer cannot follow stretching the outer surface layer. As a result, the stretched multilayer structure may have streaks, or in a worse case, may be ruptured.

In order to enhance the stretchability of the multilayer structure including an EVOH resin layer, for instance, JP S63-114645A suggests an EVOH resin composition comprising a specific polyamide resin and EVOH resin, as a suitable material of the multilayer structure.

JP H08-311276A suggests an EVOH resin composition comprising two kinds of EVOH resins having an ethylene content different from each other.
[Patent document 1] JP S63-114645A
[Patent document 2] JP H08-311276A

DISCLOSURE OF THE INVENTION

Technical Problem to be Solved by the Invention

As described above, improvement has been made to enhance the stretchability of a multilayer structure by e.g. mixing other thermoplastic resin to the EVOH resin or modifying the EVOH resin itself. However, there is still room for improvement. Particularly, in the case where a multilayer structure is stretched and forced to take the contour of a mold, with tensions to be applied to the multilayer structure during stretching being different from site to site, e.g. a case of forming a multilayer structure into a cup-shaped container by a molding method including deep drawing or vacuum-pressure forming, the obtained molded product may have uneven thickness, or streaks resulting from uneven thickness, because of uneven stretching of the EVOH resin layer. Thus, the appearance of the molded product may be deteriorated. Further, since the uneven thickness of the EVOH resin layer may result in uneven thickness of a stretched polymer film, the gas-barrier properties of the entirety of the molded product may be deteriorated.

In view of the above, an object of the invention is to provide an EVOH resin composition capable of forming an EVOH resin layer with less thickness variation, and a molded product having excellent gas-barrier properties even by a stretch forming, wherein different tensions are applied from site to site, and a large tension is applied in a short time, such as a molding method including deep drawing or vacuum-pressure forming; and a multilayer structure using the resin composition.

Means for Solving the Problems

The present inventors have diligently conducted studies and researches about various resins for improvement of stretchability of EVOH resin and have found that a polyvinyl alcohol having a specific structure could contribute to improve stretchability and gas-barrier properties of EVOH resin. Thus, the present invention was completed. A resin composition (i.e. a saponified ethylene-vinyl ester copolymer composition) of the invention comprises a saponified ethylene-vinyl ester copolymer having an ethylene content of 20 to 60 mol %, and a polyvinyl alcohol having 1,2-diol structural unit in a side chain represented by the general formula (1). In the formula (1), each of $R^1$ to $R^6$ is independently a hydrogen atom or an organic group, and X is a single bond or a binding chain.

[formula 1]

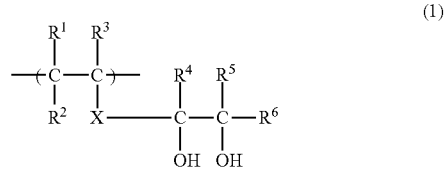

The amount of the polyvinyl alcohol is preferably from 1 part or more and less than 100 parts by weight with respect to 100 parts by weight of the saponified ethylene-vinyl ester copolymer. The content of the 1,2-diol structural unit in a side chain represented by the formula (1) contained in the polyvinyl alcohol is preferably from 1 to 30 mol %.

The multilayer structure of the present invention comprises at least one layer of the inventive saponified ethylene-vinyl ester copolymer resin composition, and at least one layer of a thermoplastic resin other than a saponified ethylene-vinyl ester copolymer. The thermoplastic resin is preferably at least one selected from the group consisting of polyolefin resin, polyamide resin, and polyester resin.

In addition, the thickness ratio of the thermoplastic resin layer to the saponified ethylene-vinyl ester copolymer resin composition layer is preferably from more than 1 to 30, and furthermore the thickness of the multilayer structure is preferably from 1 to 3000 μm.

According to the present invention, the multilayer structure may be stretched one. A molded product produced by heat-stretching and forming the inventive multilayer structure into a shape is also included in the scope of the present invention. The heat-stretching is preferably performed with a mold in such a manner that the multilayer structure is forced to take the contours of the mold by stretching, and preferably performed at a draw ratio of 0.1 to 3.

Effect of the Invention

The inventive resin composition (EVOH resin composition) of a saponified ethylene-vinyl ester copolymer, and the inventive multilayer structure including a layer of the inventive EVOH resin composition are advantageous in suppressing thickness variation of the EVOH resin layer, and providing a molded product with excellent gas-barrier properties, even if the multilayer structure is stretched and forced to take the contour of a mold while being applied with different tensions from site to site.

BEST MODE FOR CARRYING OUT OF THE INVENTION

A description of the constituent elements described below is one example (a representative example) of embodiments of the present invention, and the invention should not be specified to these contents.

First of all, EVOH resin (i.e. saponified ethylene-vinyl ester copolymer) composition of the invention will be explained.

<EVOH Resin Composition>

An EVOH resin composition of the invention comprises a saponified ethylene-vinyl ester copolymer (EVOH resin) having an ethylene content of 20 to 60 mol %, and a polyvinyl alcohol having 1,2-diol structural unit in a side chain thereof.

[EVOH Resin]

The EVOH resin contained as a main component of the inventive resin composition may be produced by saponifying an ethylene-vinyl ester copolymer obtained by copolymerizing ethylene and vinyl ester monomer, and belongs to a water-insoluble thermoplastic resin. As the copolymerization method, a known polymerization method such as solution polymerization, suspension polymerization, emulsion polymerization and the like may be adopted. Also, any known saponification methods may be adopted.

For the vinyl ester monomer, vinyl acetate is typically used, but the vinyl ester is not limited to vinyl acetate. Other vinyl ester monomer, for instance, an aliphatic vinyl ester such as vinyl formate, vinyl propionate, vinyl valerate, vinyl butyrate, vinyl isobutyrate, vinyl pivalate, vinyl caprate, vinyl laurate, vinyl stearate, and vinyl versatate; aromatic vinyl ester such as vinyl benzoate; and trifluoro vinyl acetate may be used. Of these vinyl esters, an aliphatic vinyl ester having usually 3 to 20 carbon atoms, (further 4 to 10 carbon atoms, and particularly 4 to 7 carbon atoms) may be preferably used. Such vinyl ester monomer is usually used alone, but may be used in combination, as occasion demand.

Ethylene-vinyl acetate copolymer, where vinyl acetate is employed as a vinyl ester monomer, is referred to as EVA resin.

The EVOH resin used in the inventive resin composition has an ethylene content of 20 to 60 mol %, preferably 25 to 55 mol %, and more preferably 28 to 48 mol %, as measured according to ISO4663. When the ethylene content is unduly small, melt-moldability of the resin composition tends to be degraded. On the contrary, when the ethylene content is unduly high, OH groups in the polymer chain of the EVOH resin become too decreased, which results in lowering gas-barrier properties.

The saponification degree of the vinyl ester moiety is in the range of usually 80 to 100 mol %, preferably 90 to 100 mol %, and more preferably 95 to 100 mol %, which is measured according to JIS K6726 with respect to a EVOH solution (solvent: water/methanol). When the saponification degree is unduly low, gas-barrier properties tend to be lowered.

In addition, the melt flow rate (abbreviated as "MFR") of the EVOH resin is in the range of usually 1 to 30 g/min, preferably 2 to 15 g/min, and particularly preferably 3 to 10 g/min, which is measured under the condition of 210° C. with a load of 2160 g. Unduly high MFR tends to have difficulty in stable melt extrusion due to low melting viscosity. Unduly low MFR also tends to have difficulty in stable melt extrusion due to high melting viscosity.

Two or more kinds of EVOH resins having a different ethylene content and/or saponification degree may be used together in the inventive resin composition, as long as each EVOH resin to be used meets with the aforementioned requirements.

Moreover, the EVOH resin used in the invention may contain a small amount of other comonomers. Examples of the other comonomers include α-olefin such as propylene, isobutene, α-octene, α-dodecene, α-octadecen and the like; hydroxyl group-containing α-olefin such as 3-butene-1-ol, 4-penten-1-ol, or ester, acyl thereof, or their derivatives; unsaturated carboxylic acid or salt thereof, partial alkyl ester thereof, complete alkyl ester thereof, nitrile, amide, anhydride, unsaturated sulfonic acid or a salt thereof, vinylsilane compound, vinyl chloride, styrene, and the like. Furthermore, a post-modified (e.g. urethanated, acetalized, cyanoethylated, oxyalkylenated) EVOH resin may be also used.

The EVOH resin to be used may contain an additive which is conventionally added to EVOH resins, for instance, antioxidant, antistatic agent, colorant, ultraviolet absorber, slipping agent, plasticizer, heat stabilizer, light stabilizer, surfactant, antimicrobial agent, drying agent, antiblocking agent, flame retardant, crosslinking agent, curing agent, blowing agent, nucleating agent, anti-fogging agent, biodegradable agent, silane coupling agent, or oxygen absorbent, within the range that the advantage of the present invention is not impaired.

[Polyvinyl Alcohol]

The polyvinyl alcohol to be used in the resin composition of the invention is a polyvinyl alcohol having a 1,2-diol structural unit in a side chain represented by the general formula (1), which is hereinafter sometimes referred to as "side chain 1,2-diol-modified PVA". Such polyvinyl alcohol is water-soluble.

[formula 1]

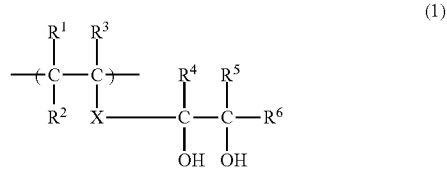

In the formula (1), each of $R^1$ to $R^6$ is independently a hydrogen atom or an organic group. It is preferable that all of $R^1$ to $R^6$ are hydrogen atoms, but some of $R^1$ to $R^6$ may be organic groups within the range that properties of the polyvinyl alcohol resin are not impaired. As the organic group, an alkyl group having 1 to 4 carbon atoms, such as methyl group, ethyl group, n-propyl group, iso-propyl group, n-butyl group, iso-butyl group, tert-butyl group, and the like, is preferable, but is not limited thereto. In addition, the organic group may contain a substituting group such as halogen group, hydroxyl group, ester group, carboxylic acid group, and sulfonic acid group, according to necessity.

In the formula (1), X is a single bond or a binding chain, and preferably single bond from the viewpoint of thermal stability and stability under the condition of high temperature or acid. Non-limiting examples of the binding chain include hydrocarbon such as alkylene, alkenylene, alkynylene, phenylene, naphthylene (these hydrocarbons may be substituted with a halogen such as fluorine, chlorine, bromine or the like); —O—, —(CH$_2$O)m-, —(OCH$_2$)m-, —(CH$_2$O)mCH$_2$—, —CO—, —COCO—, —CO(CH$_2$)mCO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$ O—, —OAl(OR)—, —OAl(OR)O—, wherein R each represents independently any substituting group, preferably hydrogen atom or alkyl group, and m is positive integer. Of these binding chains, alkylene group having 6 or less carbon atoms (further methylene group or —CH$_2$OCH$_2$—) is preferred from the viewpoint of stability when producing and using.

The side chain 1,2-diol-modified PVA having the above construction has generally a melting point of 150 to 205° C. depending on the saponification degree or the content of the 1,2-diol structural unit in a side chain. The melting point lower than the melting point of an ordinary PVA (hereinafter, called as "unmodified PVA") formed by saponification of polyvinyl ester provides an advantage that a wide temperature range can be used at the time of stretching. Further, The side chain 1,2-diol-modified PVA has an advantage that the crystallization speed is slower than that of unmodified PVA, in addition to the gas-barrier properties according to the content of hydroxyl groups in the polymer chains, and the strength of hydrogen bond based on a primary hydroxyl group, as well as unmodified PVA. Although a reason and a mechanism of the above phenomenon are not clear, presumably, because hydrogen bond based on a primary hydroxyl group of the 1,2-diol structural unit contained in the modified PVA is strong, a relaxation time of a diol moiety in the side chain is extremely long, as compared with a relaxation time of a crystalline moiety based on a hydroxyl group in the main chain.

According to the present invention, such side chain 1,2-diol-modified PVA may be contained in less amount than the EVOH resin in the resin composition. The amount of the side chain 1,2-diol-modified PVA in the resin composition is from 1 to 100 (but excluding 100) parts, preferably 3 to 70 parts, more preferably 5 to 70 parts, and particularly preferably 10 to 50 parts by weight with respect to 100 parts by weight of EVOH resin.

Since an EVOH resin is water-insoluble while a PVA resin is water-soluble, it is not ordinary that mixing an EVOH resin with a PVA resin in consideration of water resistance. Therefore, the inventive resin composition is characterized by such mixture.

Since the side chain 1,2-diol-modified PVA is more excellent in gas-barrier properties than the EVOH resin used, the inventive EVOH resin composition containing the side chain 1,2-diol-modified PVA provides an advantage that gas properties of the layer of the resin composition is more enhanced than that of the layer solely made of EVOH resin.

Further, the layer of the EVOH resin composition containing the side chain 1,2-diol-modified PVA at the above content ratio exhibits good stretchability, as compared with a layer solely made of an EVOH resin. Accordingly, it is possible to apply even tension to the entirety of the layer. Further, since partial and quick crystallization of EVOH resin is suppressed even at the time of cooling, uniformity of the crystallization degree with respect to the inventive EVOH resin composition layer can be secured. Thus, the EVOH resin composition layer after stretching has less thickness variation because of even stretching, and shows excellent gas-barrier properties because of enhanced uniformity of the crystallization degree.

The content of the 1,2-diol structural unit in the side chain 1,2-diol-modified PVA is preferably from 1 to 30 mol %, more preferably 1 to 20 mol %, and further more preferably 3 to 10 mol %. When the content of the 1,2-diol structural unit is unduly high, thermal stability during extrusion tends to be degraded. On the contrary, when the content of the 1,2-diol structural unit is unduly low, melt extrusion property deteriorated due to elevation of melting point. In addition, as a content of 1,2-diol structural unit is lowered in the side chain 1,2-diol-modified PVA, the modified PVA becomes similar to an unmodified PVA whose crystallization speed is high at the time of cooling after stretching, resulting in degrading uniformity of the EVOH resin composition layer.

The content of the 1,2-diol structural unit in the modified PVA is calculated based on $^1$H-NMR spectrum (solvent: DMSO-d6, internal standard: tetramethylsilane) of completely saponified PVA, concretely, calculated with respect to the area of the peaks derived from hydroxyl proton, methyne proton and methylene proton in the modified PVA, and methylene proton of its main chain, hydroxyl group bonded to its main chain, and the like.

The polymerization degree of the side chain 1,2-diol-modified PVA used in the invention is typically from 100 to 5000, preferably 100 to 1000, and more preferably 300 to 500. When the polymerization degree is unduly high, stable melt extrusion becomes difficult due to high melting viscosity. Also, the polymerization degree is unduly low, stable melt extrusion becomes difficult.

The saponification degree of the side chain 1,2-diol-modified PVA used in the invention is typically from 80 to 100 mol %, preferably 90 to 100 mol %, and more preferably 95 to 100 mol %, as measured according to JIS K6726. The side chain 1,2-diol-modified PVA having unduly low saponification degree is lowered in gas-barrier properties, resulting in making difficult to obtain the advantageous effect of enhancing gas-barrier of the EVOH resin composition.

The most preferable side chain 1,2-diol-modified PVA to be used in the invention has a 1,2-diol structural unit represented by the formula (1) where all of $R^1$ to $R^6$ are hydrogen atoms and X is a single bond, corresponding to the structural unit represented by the following formula (1a).

[formula 1a]

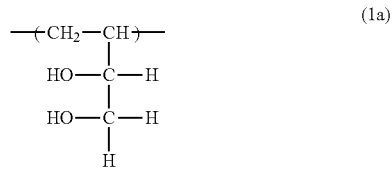

(1a)

The most preferable side chain 1,2-diol-modified PVA constitutes 3 to 10 mol % of the structural unit (1a), a structural unit derived from vinyl alcohol, and a slight amount of vinyl ester structural unit still remained after saponification, and has a saponification degree within the range of 95 to 100% and a polymerization degree within the range of 300 to 500.

The production method of such PVA having 1,2-diol structural unit in a side chain is not particularly limited, but preferable examples of the production method are as follows: (i) a method of saponifying a copolymer of vinyl ester monomer and a monomer represented by the general formula (2); (ii) a method of saponifying and decarbonating a copolymer of vinyl ester monomer and a compound represented by the general formula (3); and (iii) a method saponifying and deketalizing a copolymer of vinyl ester monomer and a compound represented by the general formula (4), and the like.

[formula 2]

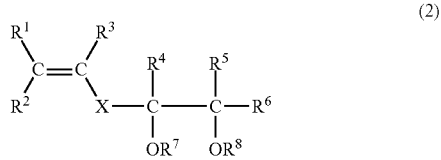

(2)

[formula 3]

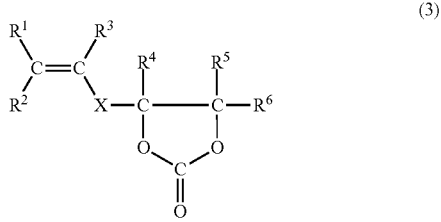

(3)

[formula 4]

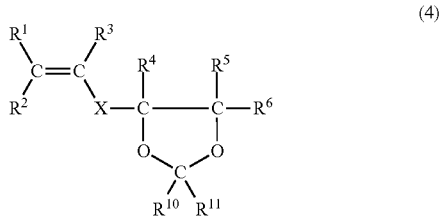

(4)

In the formulae (2), (3), and (4), any of $R^1$ to $R^6$ is the same as ones of the formula (1). Each of $R^7$ and $R^8$ is independently a hydrogen atom or $R^9$—CO—, wherein $R^9$ is an alkyl group. Each of $R^{10}$ and $R^{11}$ is independently a hydrogen atom or an organic group.

Methods described in JP2006-95825A may be incorporated for the methods of (i), (ii) and (iii).

Among these methods, the method (i) is preferable, because the method (i) is superior in copolymerization reactivity and industrial handling. Furthermore, in the method (i), a compound where all of $R^1$ to $R^6$ are hydrogen atoms and X is a single bond, and both of $R^7$ and $R^8$ are $R^9$—CO— (wherein $R^9$ is alkyl group), which corresponds to 3,4-diacyloxy-1-butene is preferably used, and a compound where $R^9$ is methyl group, which corresponds to 3,4-diacetoxy-1-butene is more preferably used.

A compound other than the above-mentioned monomers (vinyl ester monomer and compounds represented by the formulae (2), (3), and (4)) may be copolymerized in the side chain 1,2-diol-modified PVA used in the invention in the range of such proportion (e.g. 10 mol % or less) that gas-barrier properties and melt extrusion property are not impaired. Examples of the comparative compound include α-olefin such as ethylene and propylene and the like; hydroxyl group-containing α-olefin such as 3-butene-1-ol, 4-penten-1-ol, and the like, or ester thereof, or hydroxyl group-containing α-olefin derivative such as acyl and the like; unsaturated carboxylic acid such as itaconic acid, maleic acid, acrylic acid and the like, or a salt thereof, or mono- or di-alkyl ester, nitrile such as acrylonitrile, amides such as methacrylamide, diacetone acrylamide and the like, olefin sulfonic acid such as ethylene sulfonic acid, allyl sulfonic acid, methallyl sulfonic acid, AMPS and the like or a salt thereof, allyl acetate, butadiene derivative and the like.

Other Component

In addition to the EVOH resin and the side chain 1,2-diol structural unit-containing PVA, the inventive resin composition may further optionally contain additives such as antioxidant, slipping agent, hydrotalcites, antistatic agent, colorant, and ultraviolet absorber, as occasion demand.

The inventive resin composition may be prepared by blending the aforementioned components, for instance, by a method of mixing the melted components, or a method of preparing EVOH resin solution (solvent: water-alcohol or dimethylsulfoxide) and mixing components in a solution state.

In the method of solution mixing, the order of mixing components is not limited. Examples of the solution mixing methods are (i) a method of dry-blending components and thereafter dissolving the obtained mixture in a good solvent in common to both resins; (ii) a method of mixing a solution of one resin with a solution of the other resin; and (iii) a method of preparing solutions by dissolving the respective resins in good solvent and mixing the prepared solutions.

In the method of melt mixing, the order of mixing components is not limited. Examples of the melt mixing methods are (i) a method of dry-blending components and mixing while melting; (ii) a method of mixing a melted resin with the other resin; and (iii) a method of melting resins and then mixing the melted resins.

Of these methods, the melt mixing method is preferably employed from the viewpoint of productivity. The melt mixing method may be conducted using a known kneading apparatus such as kneader-ruder, extruder, mixing roll, banbury mixer, or plasto mill. It is preferable to use a single screw extruder or twin screw extruder in industrial point of view. Further, it is preferable for such kneading apparatus to be optionally equipped with vent suction device, gear pump, screen, and the like. High quality resin composition with reduced in heat coloring or heat deterioration can be obtained by providing one or more vent holes in the extruder and suctioning under a decreased pressure to remove moisture and/or by-products (e.g. low molecular weight substances generated by thermal decomposition etc.), or by continuously feeding inert gas such as nitrogen into hopper to prevent the contamination of oxygen into the extruder.

The inventive EVOH resin composition having the above-mentioned constituents can exhibit an excellent appearance after stretching and excellent gas-barrier properties in addition to properties of EVOH resin itself such as water-insolubility and gas-barrier properties.

The EVOH resin composition of the invention may be used as a material of various molded products such as film, sheet, container, rod, pipe and the like, preferably, may be laminated on a thermoplastic resin layer having non-water permeability to provide a multilayer structure used for various molded products.

Molded products using an inventive EVOH resin composition may be produced from the EVOH resin composition directly after mixing as mentioned above, or produced from the pellets of the mixture obtained by mixing as mentioned above.

<Multilayer Structure>

In the specification, a multilayer structure and a multilayer laminate are used in the same meaning. A multilayer structure of the present invention comprises at least one layer of the inventive EVOH resin composition (hereinafter, the layer being simply referred to as "EVOH resin composition layer"), and at least one layer of thermoplastic resin other than a saponified ethylene-vinyl ester copolymer (hereinafter, "thermoplastic resin layer" without explanation is meant for this layer in this specification, unless otherwise indicated).

The thermoplastic resin used for the thermoplastic resin layer is not particularly limited except that EVOH resin is excluded. Examples of the thermoplastic resins are, for instance, olefin homo- or copolymer such as linear low density polyethylene, low density polyethylene, middle density polyethylene, high density polyethylene, ethylene-vinyl acetate copolymer, ionomer, ethylene-propylene copolymer, ethylene-acrylic acid ester copolymer, polypropylene, propylene-α-olefin (having 4 to 20 carbon atoms) copolymer, polybutene, polypenten and the like, or polyolefins in a broad sense such as olefin homo- or copolymer graft-modified with an unsaturated carboxylic acid or ester thereof, ring olefin-based resin, polystyrene-based resin, polyester, polyamide, copolymerized polyamide, polyvinyl chloride, polyvinylidene chloride, acryl-based resin, vinyl ester-based resin, polyester elastomer, polyurethane elastomer, chlorinated polyethylene, chlorinated polypropylene. Of these thermoplastic resins, polyolefin resin, polyamide-based resin, and polyester-based resin, (particularly polyolefin resin, more particularly polyethylene and polypropylene) are preferably used, in terms of non-water permeability. A multilayer structure including a layer of such non-water permeable thermoplastic resin is suitable for a material for packaging film or container required for gas-barrier properties.

According to the present invention, paper, foil, uni- or biaxial stretched plastic film or sheet, fabric, non-woven fabric, metal cotton, wooden article and the like may be laminated on the EVOH resin composition layer and/or the thermoplastic resin layer. Furthermore, an outer surface or an interlayer between layers of a multilayer structure may be applied with an aluminium deposition or a silica deposition.

Such a multilayer structure may be typically produced by a melt-forming method where EVOH resin composition is melted upon heating and formed into a shape.

Examples of the melt-forming method are, for instance, a method of melt-extruding thermoplastic resin on a film or sheet of EVOH resin composition, a method of melt-extruding a EVOH resin composition layer over a substrate of thermoplastic resin, a method of co-extruding an EVOH resin composition layer and a thermoplastic resin layer, and a method of co-injecting an EVOH resin composition layer and a thermoplastic resin layer.

Moreover, another method, such as a method of dry-laminating EVOH resin composition film and a substrate of thermoplastic resin or the like with use of a known adhesive (e.g. organic titanium compound, isocyanate compound, polyethylene imine-based compound, polyester-based compound, polyurethane-based compound and so on), and a method of laminating a film of EVOH resin composition and a substrate of thermoplastic resin or the like through an adhesive resin layer.

The adhesive resin constituting the adhesive resin layer is not specifically limited, but various materials may be used. An exemplified adhesive resin is an olefin-based polymer modified with a carboxyl group. The polymer may be obtained by chemically bonding an unsaturated carboxylic acid or an anhydride thereof to an olefin-based polymer (the aforementioned polyolefin in a broad sense) by e.g. addition reaction or graft reaction. Specific examples of the polymer modified with unsaturated carboxylic acid or the anhydride thereof are one selected from polyethylene graft-modified with maleic anhydride, polypropylene graft-modified with maleic anhydride, ethylene-ethyl acrylate copolymer graft-modified with maleic anhydride, and ethylene-vinyl acetate copolymer graft-modified with maleic anhydride, and a mixture thereof.

Accordingly as long as a multilayer structure comprises at least one layer of the inventive EVOH resin composition and at least one layer of the thermoplastic resin, the multilayer structure is included in the scope of the inventive multilayer structure before stretching. The combination and number of the layers of the multilayer structure is not particularly limited. The number is usually from 3 to 15 layers, preferably 3 to 7 layers, and more preferably 5 to 7 layers, and arbitrary combinations including b/a/b, a/b/a, a1/a2/b, a/b1/b2, b2/b1/a/b1/b2, b2/b1/a/b1/a/b1/b2 are possible, wherein the EVOH resin composition layer is referred to as "a" (a1, a2, . . . ), and thermoplastic resin (excluding EVOH resin) layer is referred to as "b" (b1, b2, . . . ).

Further, a recycled layer of the composition which is obtained by remelting ends and/or waste portions generated in the process of production of a multilayer structure and comprises an EVOH resin composition and a thermoplastic resin (excluding EVOH resin) as constituent of the multilayer structure, may be included. In the case that the recycled layer is included in a multilayer structure, when the recycled layer is referred to as "R", such combinations as b/a/R, R/b/a, b/R/a/b, b/R/a/R/b, b/a/R/a/b, b/R/a/R/a/b and the like are also possible.

Further, in such multilayer structures, a known adhesive resin layer may be included as an interlayer between respective layers.

In particular, it is preferable that the resin composition layer is arranged as an intermediate layer from the viewpoint of suppressing lowering gas-barrier properties caused by water permeation of the resin composition layer. Specifically, a preferable multilayer structure has a combination such as thermoplastic resin layer/adhesive resin layer/EVOH resin composition layer/adhesive resin layer/thermoplastic resin layer.

The thickness of the multilayer structure of the present invention is usually from 1 to 3000 μm, preferably 3 to 1300 μm. In the multilayer structure having such range of thickness, the thicknesses of any of the thermoplastic resin layer, the EVOH resin composition layer and the adhesive resin layer are not particularly limited, but it is preferable that the thickness of the thermoplastic layer is usually from 0.1 to 1000 μm (further 1 to 500 μm), the thickness of the EVOH resin composition layer is usually from 0.1 to 500 μm (further 1 to 100 μm), and the thickness of the adhesive resin layer is usually from 1 to 250 μm (further 0.1 to 100 μm).

When the multilayer structure comprises a plurality of EVOH resin layers and a plurality of thermoplastic resin layers respectively, a thickness ratio of thermoplastic resin layer/EVOH resin composition layer is usually from more than 1 to 30, and preferably 2 to 20, in terms of the ratio of the thickest thermoplastic resin layer and the thickest EVOH resin composition layer. The thickness ratio of adhesive resin layer/EVOH resin composition layer is usually from 0.1 to 1, and preferably 0.25 to 1. When the thickness ratio of thermoplastic resin layer/EVOH resin composition layer is unduly small, humidity proof property and/or strength tends to be deteriorated, and to the contrary, when the thickness ratio is unduly large, transparency tends to be lowered, and cost for production becomes increased.

Preferably, the inventive multilayer structure is further treated with heat stretching. In a multilayer structure including a thermoplastic resin layer, gas-barrier properties of the EVOH resin composition layer can be enhanced, as well as increasing the strength thereof by stretching. Particularly, as described above, the EVOH resin composition layer included in the inventive multilayer structure is easily extended at the time of stretching. Further, since the crystallization speed is slow, the inventive multilayer structure is free from e.g. ruptures, pinholes, cracks, and uneven thickness even by high magnification stretching. Thus, an even thickness can be secured in the layer after stretching. The inventive multilayer structure also has good appearance after stretching, and shows excellent gas-barrier properties and transparency because of even thickness.

A known stretching method may be employed as the stretching treatment.

Examples of the stretching methods are, for instance, uni- or biaxial stretching where a multilayer structure is extended with holding both sides thereof; a method where a multilayer structure is stretched to be forced to take the contours of a mold, such as deep drawing, vacuum forming, air-pressure forming, vacuum-pressure forming; and a method where a preformed multilayer structure such as parison is stretched by e.g. tubular stretching and stretch blowing.

The stretching temperature is selected from a range of usually 50 to 300° C., preferably 60 to 160° C., at a temperature (in the vicinity) of the multilayer structure. The stretching magnification is selected from a range of usually 2 to 50 times, and preferably 2 to 10 times, in terms of area ratio.

For instance, in the case of uniaxial stretching or biaxial stretching (any of simultaneous biaxial orientation system or sequential biaxial orientation system can be adopted), the stretching temperature is selected from a range of usually approximately 50 to 300° C., preferably 60 to 160° C., at a temperature in the vicinity of the multilayer structure. The stretching magnification is usually from 2 to 50 times, and preferably 2 to 10 times, in terms of area ratio.

In the case of forming a film or sheet, uniaxial stretching or biaxial stretching is preferably employed.

In the case where a sheet or film is forced to take the contours of a mold by a molding method including deep drawing, vacuum forming, air-pressure forming, or vacuum-pressure forming, the sheet or film of a multilayer structure is evenly heated by a hot-air oven or a heater type oven, alone or in combination, and formed into molded products of various shapes with even thickness, using e.g. a chuck, a plug, a vacuum force, or a pressure force.

In the stretch forming method, the temperature of a multilayer structure (temperature in the vicinity of a multilayer structure) is normally selected from a range from about 50 to 300° C., and preferably from about 60 to 160° C.

In the case where a molded product such as cups or trays with a draw ratio (a depth (unit:mm) of the molded product/a maximum diameter (unit:mm) of the molded product) normally in a range from 0.1 to 3 is produced, it is preferable to adopt a molding method where a sheet is stretched and forced to take the contours of a mold, e.g. deep drawing, vacuum forming, pressure forming, or vacuum-pressure forming.

Among the molding methods, the vacuum-pressure forming including high magnification stretching is particularly preferably adopted. In the case where the vacuum-pressure forming is performed, tensions to be applied to a resin layer are different between a side portion and a bottom portion of a cup. Accordingly, thickness variation may likely occur, if stretchability of the resin layer is poor. The inventive multilayer structure, however, has the advantages that the EVOH resin composition layer included in the multilayer structure is easily stretched, and the crystallization speed is slow. Accordingly, a molded product with less thickness variation can be obtained even by vacuum-pressure forming. Thus, use of the inventive EVOH resin composition is advantageous in providing a molded product with good appearance and enhanced gas-barrier properties, even if stretch forming such as vacuum-pressure forming accompanying a severe condition that it is difficult to apply even tension is performed.

The draw ratio (a depth (unit:mm)/a maximum diameter (unit:mm)) of the molded product using the inventive EVOH resin composition is normally from 0.1 to 3, preferably from 0.2 to 2.5, and more preferably from 0.3 to 2. If the draw ratio is unduly large, cracks are likely to be formed in the EVOH resin composition layer, and if the draw ratio is unduly small, the effect by stretching may not be sufficiently obtained.

Furthermore, in the case of employing a stretch blowing or a tubular stretching, a preformed multilayer structure (e.g. parison), is evenly heated with a hot-air oven, a heater type oven, or the combination thereof, to be forced to take a various shapes by a chuck, a plug, a vacuum pressure or air-pressure, or the like.

In such stretch forming method, a temperature (in the vicinity) of the multilayer structure is normally set in the range of 50 to 300° C., and preferably 60 to 160° C.

In the case of forming a hollow container such as bottle, it is preferable to employ a tubular stretching, a stretch blowing and the like.

The multilayer structure after stretching has a thickness of 1 to 1300 μm, preferably 3 to 700 μm, wherein the thermoplastic resin layer has a thickness of usually 0.1 to 500 μm, preferably 1 to 300 μm, the EVOH resin composition layer has a thickness of usually 0.1 to 100 μm, preferably 1 to 50 μm, and the adhesive resin layer has a thickness of usually 0.1 to 100 μm, preferably 0.1 to 30 μm.

A thickness ratio of the EVOH resin composition layer to the adhesive resin layer, and a ratio of total thicknesses of the EVOH resin composition layers to thermoplastic resin layers are not varied before and after stretching, and therefore the respective ratios are similar to the corresponding ratios of the multilayer structure before stretching.

As described above, the inventive EVOH resin composition layer can maintain uniformity thereof even after stretching at high magnification, and does not have remarkably streaks or waves with locally uneven thicknesses due to thickness variation, and therefore exhibit excellent gas-barrier properties. Accordingly, the inventive multilayer structure may be used for materials of various molded products, in particular, suitably used for materials for molded products produced by stretching treatment under high temperatures.

EXAMPLE

The present invention will be explained in further detail by providing Examples and Comparative Examples, however, the present invention is not limited to these examples, as long as it does not depart from the gist of the invention.

Incidentally, "parts" in the examples are on the weight basis, unless otherwise indicated.

[Measurement/Evaluation Method]

(1) Thickness Variation (Cups)

Three parts on a side wall around an opening, three parts on a side portion near a bottom portion, and one part on a bottom portion of each of the produced cups were cut out in an area of 1 cm×1 cm, the thicknesses of the EVOH resin composition layer of these parts were measured, and an average thickness, and a difference between maximum and minimum thicknesses were obtained with respect to each of the cups.

In the case where the difference between maximum and minimum thicknesses was smaller than 10 μm, the cups were determined to be "good (o)"; in the case where the difference was from 11 to 19 μm, the cups were determined to be "fair (Δ)"; and in the case where the difference was equal to or larger than 20 μm, the cups were determined to be "bad (x)".

(2) Appearance (Cups)

The appearances of the cups were visually observed, and evaluated in three stages, wherein "good (o)" means no or less vertical streaks and/or locally uneven thickness was observed, "fair (Δ)" means vertical streaks or locally uneven thickness was clearly observed on the side portions of the cups, and "bad (x)" means vertical streaks and locally uneven thickness were clearly observed on the side portions of the cups.

(3) Thickness Variation (Films)

Six parts of each of the produced films were at randomly cut out in an area of 1 cm×1 cm, the thicknesses of the EVOH resin composition layer of these parts were measured, and an average thickness, and a difference between maximum and minimum thicknesses were obtained with respect to each of the films.

(4) Appearance (Film)

The appearance of the produced films (having 3 kinds of resins and 5 layers) were visually observed, and evaluated in two stages, wherein "good (o)" means no or less vertical streaks and/or waves due to uneven thickness was observed, and "bad (x)" means vertical streaks and/or waves due to uneven thickness were clearly observed.

(5) Gas-Barrier Properties (Cups)

The top surfaces of the cups were sealed by an aluminium foil, and the oxygen permeable amounts of the cups were measured using OXTRAN2/20 of MOCON at 23° C. and 50% RH. The oxygen permeable amount (unit: cc/pkg·day·air) per 20 μm of the EVOH resin composition layer was calculated by dividing by the average thickness calculated in (1).

The indication "pkg" is an abbreviation of Package, and means that the oxygen permeable amount is measured with respect to the entirety of a cup. The indication "air" means that the gas used in measuring the oxygen permeable amount was the air (oxygen partial pressure: 0.2 atm).

(6) Gas-Barrier Properties (Films)

The oxygen permeable amounts of the multilayer films were measured using OXTRAN2/20 of MOCON at 23° C. and 50% $R^H$, and the oxygen permeable amount (unit: cc/m²·day·atm) per 20 μm of the EVOH resin composition layer was calculated.

<Resins>

Two types of saponified ethylene-vinyl acetate copolymers (i.e. EVOH1 and EVOH2) and three types of PVA resins (PVA1, PVA2, and PVA3), each having properties shown in Table 1, were used.

The content of the 1,2-diol structural unit represented by the formula (1a) in the PVA resin was calculated based on $^1$H-NMR.

The saponification degrees were measured according to titration method (JIS K6726).

The polymerization degrees were measured according to (aqueous) solution viscosity method (JIS K6726).

TABLE 1

|  | ethylene content (mol %) | content of 1,2-diol structural unit (mol %) | saponification degree (mol %) | MFR (g/10 min) 210° C., 2160 g | polymerization degree |
|---|---|---|---|---|---|
| EVOH1 | 29 | — | 99.7 | 4 | — |
| EVOH1 | 51 | — | 94.0 | 25 | — |
| PVA1 | — | 8 | 99.0 | — | 500 |
| PVA2 | — | 0 | 99.0 | — | 500 |
| PVA3 | — | 8 | 99.0 | — | 600 |

Example 1 and Comparative Examples 1 to 3

Resins were dry-blended as shown in Table 2. The mixture was fed to twin screw extruder (φ30 mm, L/D=43) with two mixing zones, and melt-kneaded with the extruder (temperature pattern: C1/C2/C3/C4/C5/C6/C7/H/D=200/210/230/230/230/230/230/230° C.), and thereafter extruded in a strand form, followed by cutting to obtain pellets of EVOH resin composition.

The prepared EVOH resin composition pellet, polypropylene (Japan Polypropylene Corporation "EA6A"), and adhesive resin (Mitsubishi Chemical Corporation "MODIC-AP_P604V") were fed to a multilayer co-extruding apparatus equipped with three extruders, 3 kind and 5 layer-type feedblocks, multilayer film-forming die, and chill roll, to form a multilayer film having a combination of 3 kinds and 5 layers (i.e. polypropylene layer/adhesive resin layer/EVOH resin composition layer/adhesive resin layer/polypropylene layer). With regard to the temperatures of the dies, all were set to a temperature of 230° C. The multilayer film thus produced has a thickness of 320 μm, and a thickness pattern of the constituting layers is 120 μm/20 μm/40 μm/20 μm/120 μm.

The obtained multilayer films were supplied to a plug assist-type vacuum-pressure forming apparatus (Asano Laboratories Co., Ltd.) and stretched at a heater temperature of 430° C., to form a cup (a diameter of top surface: 80 mm, a diameter of bottom surface: 48 mm, depth: 52 mm, and draw ratio (a depth (unit:mm)/a maximum diameter (unit:mm) 0.65)). A thickness variation of the produced cup was evaluated according to the evaluation methods. The evaluation results were shown in Table 2.

The evaluation results with respect to the appearance and the gas-barrier properties of the cups produced were shown in Table 3.

TABLE 2

| | | Example 1 | Comparative Example 1 | Comparative Example 2 | Comparative Example 3 |
|---|---|---|---|---|---|
| resin composition (parts) | EVOH1 | 100 | 100 | 100 | 100 |
| | EVOH2 | — | — | — | 43 |
| | PVA1 | 43 | — | — | — |
| | PVA2 | — | — | 43 | — |
| measurement value of thickness(cup) (μm) | side wall around an opening | 9 (Min) | 8 (Min) | 11 | 17 |
| | | 11 | 11 | 21 | 20 (Max) |
| | | 9 | 12 | 21 | 18 |
| | side portion | 15 | 15 | 27 | 11 |
| | near a bottom | 17 | 19 | 29 (Max) | 9 |
| | | 18 (Max) | 23 | 27 | 8 |
| | bottom portion | 17 | 31 (Max) | 0 (*1) | 4 (Min) |
| average thickness (μm) | | 13.7 | 17.0 | 19.4 | 12.4 |
| Max − Min (μm) | | 9 | 23 | 29 | 16 |

Max: maximum thickness
Min: minimum thickness
(*1): polypropylene layer (outer surfaces) was not broken, while EVOH resin composition layer (intermediate layer) was broken.

TABLE 3

| | thickness variation of EVOH-containing layer | | oxygen permeable amount at 23° C., 50% RH (cc/pkg · day · air) | |
|---|---|---|---|---|
| | appearance (cup) | evaluation | average thickness (μm) | entirety (cup) | EVOH-containing layer/20 μm |
| Example 1 | ○ | ○ | 13.7 | $3 \times 10^{-4}$ | $2 \times 10^{-4}$ |
| Comparative Example 1 | x | x | 17.0 | $11 \times 10^{-4}$ | $9 \times 10^{-4}$ |
| Comparative Example 2 | x | x | 19.4 | $34 \times 10^{-4}$ | $33 \times 10^{-4}$ |
| Comparative Example 3 | ○ | Δ | 12.4 | $37 \times 10^{-4}$ | $23 \times 10^{-4}$ |

As is obvious from Table 2, in a multilayer structure (Comparative Example 1) including a layer solely made of an EVOH resin, a thickness difference between a bottom portion and a portion near the opening of the cups was large, the thickness variation of the entirety of the cups was large, and vertical streaks or locally uneven thickness was clearly observed on the side portions of the cups. On the other hand, use of a multilayer structure including a layer of the EVOH resin composition containing a PVA having 1,2-diol structural units in a side chain (Example 1) was advantageous in forming cups with a small thickness difference between a bottom portion and a portion near the opening of the cups, and less thickness variation of the entirety of the cups. In other words, observing the cups as a molded product, in Example 1, there was no or less vertical streaks and/or locally uneven thickness. Further, as is obvious from Table 3, the oxygen permeable amount of the entirety of the cups was small in Example 1, as compared with Comparative Example 1, despite that the gas-barrier layer in Example 1 had a smaller thickness than the gas-barrier layer in Comparative Example 1. The oxygen permeable amount in Example 1 was as small as about 27% of the oxygen permeable amount in Comparative Example 1. Thus, the gas-barrier properties were enhanced. Comparing the oxygen permeable amounts of EVOH resin-containing layers of the same thickness, the oxygen permeable amount of the EVOH resin composition layer in Example 1 was smaller than that of the EVOH resin layer in comparative example 1, and the oxygen permeable amount in example 1 was as small as about 22% of the oxygen permeable amount in Comparative Example 1. This result clearly shows that the gas-barrier properties of Example 1 were further enhanced. Thus, it is clear that the EVOH resin composition containing PVA having 1,2-diol structural unit in a side chain provides superior gas-barrier properties than an EVOH resin alone. An increase in the effect of enhancing gas-barrier properties of the entirety of the cups, as compared with the gas-barrier properties per unit area is presumably because the gas-barrier properties of the resin composition itself and enhancing effect of the gas-barrier properties by stretching are more effectively shown resulting from reducing the thickness variation.

With respect to Comparative Example 2 where the resin composition contains PVA2 without 1,2-diol structural unit in a side chain, a large thickness variation as well as rupture of the EVOH resin composition layer were observed on the bottom part of the multilayer structure. The result is presumably considered that the resin composition containing PVA2 without 1,2-diol structural unit in a side chain might be poor in stretchability as compared with a resin composition containing the PVA having 1,2-diol structural unit in a side chain.

Furthermore, Comparative Example 2 could not exhibit excellent gas-barrier properties inherent in any of PVA resin or EVOH resin due to rupture of the EVOH resin composition layer.

The resin composition of Comparative Example 3 where a partial saponified EVOH resin (EVOH2) having a high ethylene content is contained in place of the PVA resin showed improved stretching formability due to the high ethylene content, and the layer obtained therefrom had less thickness variation than a layer solely of EVOH resin. The stretching moldability of Comparative Example 3 was similar to one of Example 1. With regard to gas-barrier properties, however, Comparative Example 3 was inferior to Comparative Example 1 employing a layer solely of EVOH resin. It is presumably because the former has less content of OH groups in the EVOH resin composition.

Accordingly, with regard to a molded product such as cup produced by severe stretch forming, it is understood that the inventive resin composition containing the PVA resin having 1,2-diol structural unit in a side chain is useful for obtaining more excellent gas-barrier properties based on EVOH resin itself and more enhanced gas-barrier properties.

Example 2 and Comparative Example 4

EVOH resin composition of Example 2 was prepared by using PVA resin (PVA3) which has the same content of 1,2-diol structural unit as PVA1 but a different polymerization degree from PVA1, and blending EVOH resin at a ratio of EVOH resin and PVA resin as shown in Table 4, to produce pellets therefrom.

The obtained pellets of EVOH resin composition, polypropylene (Japan Polypropylene Corporation "EA7A"), and adhesive resin (Mitsubishi Chemical Corporation "ADMER QF551") were fed to a co-extruding multilayer film-forming apparatus equipped with 3 kind and 5 layer-type feedblocks, multilayer film-forming die, and chill roll, and co-extruded to form a multilayer film having a 3 kinds and 5 layers combination of polypropylene layer/adhesive resin layer/EVOH resin composition layer/adhesive resin layer/polypropylene layer. Temperatures of all dies were set to a temperature of 230° C. The multilayer film obtained has a thickness of 140 μm, and a thickness pattern of 50 μm/10 μm/20 μm/10 μm/50 μm in respective layers.

The multilayer film produced was supplied to a biaxial stretching device (KARO IV manufactured by BRUCK-NER), and applied to simultaneous biaxial orientation treatment (stretching magnifications of longitudinal and transverse directions: 1.3 times, stretching speed: 100 mm/sec, stretching temperature: 155° C., preheating time: 40 seconds, test piece: length×width=9 cm×9 cm), and thereafter evaluated with regard to appearance of the multilayer film and gas-barrier properties according to the above-mentioned evaluation method. The results were shown in Table 4.

A 3 kind and 5 layer-multilayer film of Comparative Example 4 where a layer solely of EVOH resin (EVOH1) is included in place of the layer of the resin composition containing PVA3 was produced in the same manner as one of Example 2, and evaluated. The result was shown in Table 4.

TABLE 4

|  |  | Example 2 | Comparative Example 4 |
|---|---|---|---|
| resin composition (parts) | EVOH1 | 90 | 100 |
|  | PVA3 | 10 | — |

TABLE 4-continued

|  |  | Example 2 | Comparative Example 4 |
|---|---|---|---|
| thickness of film (μm) | measurement value | 13 (Min) | 17 |
|  |  | 19 (Max) | 19 (Max) |
|  |  | 14 | 14 |
|  |  | 15 | 4 (Min) |
|  |  | 16 | 16 |
|  |  | 15 | 17 |
|  | average thickness | 15 | 15 |
|  | Max − Min | 6 | 15 |
| evaluation (film) | appearance (film) | ○ | X |
|  | oxygen permeable amount (thickness: 20 μm) (cc/m² · day · atm) | 6 × 10⁻² | 9 × 10⁻² |

Max: maximum thickness
Min: minimum thickness

Comparing results of Example 2 and Comparative Example 4, average thickness of EVOH resin layer (Comparative Example 4) was the same as one of EVOH resin composition layer (Example 2) in the respective multilayer film. A difference between maximum thickness and minimum thickness of Comparative Example 4, however, had 2 times or more than that of Example 2. In other words, thickness variation of Example 2 is smaller. Such superiority of thickness variation was shown as superiority of an appearance as well as superiority in oxygen permeation. Concretely, Comparative Example 4 showed 1.5 times larger oxygen permeable amount than Example 2, which means that Comparative Example 4 is inferior to Example 2 in gas-barrier properties. Accordingly, it is understood that mixing EVOH resin with the PVA resin having 1,2-diol structural unit in a side chain can contribute to reduce thickness variation of a molded product produced by stretch forming, and to improve an appearance of the surface of the molded product, as well as the gas-barrier properties.

INDUSTRIAL APPLICABILITY

The layer of the EVOH resin composition of the present invention is excellent in stretchability in the process of heat-stretching treatment, and has less uneven thickness after the stretching, and exhibits improved gas-barrier properties. Since the layer of the inventive EVOH resin composition has a high degree of crystallization even if after stretching, the multilayer structure of the invention is applicable for various molded products required for excellent appearance and gas-barrier properties, despite that the molded product is produced by severe stretch forming such as a vacuum-pressure forming liable to occur uneven thickness.

The invention claimed is:

1. A saponified ethylene-vinyl ester copolymer resin composition comprising a saponified ethylene-vinyl ester copolymer having an ethylene content of 20 to 60 mol %, the saponified ethylene-vinyl ester copolymer being water-insoluble, and a polyvinyl alcohol having a polymerization degree of 100 to 5000 and having a 1,2-diol structural unit in a side chain thereof represented by the formula (1)

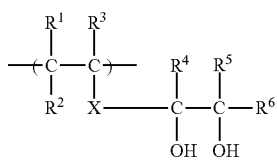

wherein each of $R^1$ to $R^6$ is independently a hydrogen atom or an organic group, and X is a single bond or a binding chain, and wherein the amount of the polyvinyl alcohol is in the range of 10 to 50 parts by weight with respect to 100 parts by weight of the saponified ethylene-vinyl ester copolymer.

2. The saponified ethylene-vinyl ester copolymer resin composition according to claim 1, wherein the content of 1,2-diol structural unit in a side chain thereof represented by the formula (1) in the polyvinyl alcohol is in the range of 1 to 30 mol %.

3. The saponified ethylene-vinyl ester copolymer resin composition according to claim 1, wherein the saponification degree of the polyvinyl alcohol is in the range of 80 to 100 mol %.

4. The saponified ethylene-vinyl ester copolymer resin composition according to claim 1, wherein the polyvinyl alcohol has the 1,2-diol structural unit in a side chain represented by the formula (1) wherein each of $R^1$ to $R^6$ is independently an alkyl group having from 1 to 4 carbon atoms, and X is an alkylene group having 6 or less carbon atoms.

5. The saponified ethylene-vinyl ester copolymer resin composition according to claim 1, wherein the 1,2-diol structural unit in a side chain represented by the formula (1) in the polyvinyl alcohol is a structural unit represented by the formula (1a)

[formula 1a]

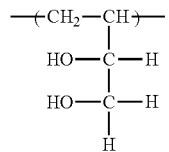

6. The saponified ethylene-vinyl ester copolymer resin composition according to claim 1, wherein the saponification degree of the saponified ethylene-vinyl ester copolymer is in the range of 80 to 100 mol %.

7. The saponified ethylene-vinyl ester copolymer resin composition according to claim 1, wherein the resin composition has a melt flow rate (MFR) of 1 to 30 g/min under the condition of 210° C. and a load of 2160 g.

8. The resin composition according to claim 1, wherein the saponified ethylene-vinyl ester copolymer is a saponified ethylene-vinyl acetate copolymer.

9. A multilayer structure comprising
at least one layer of the saponified ethylene-vinyl ester copolymer resin composition according to claim 1, and
at least one layer of a thermoplastic resin other than an ethylene-vinyl ester copolymer.

10. The multilayer structure according to claim 9, wherein the thermoplastic resin is at least one selected from polyolefin resin, polyamide resin, and polyester resin.

11. The multilayer structure according to claim 9, wherein the thickness ratio of the layer of the thermoplastic resin layer to the layer of the saponified ethylene-vinyl ester copolymer resin composition is in the range of more than 1 to 30.

12. The multilayer structure according to claim 9, wherein the multilayer structure has 3 to 15 layers.

13. The multilayer structure according to claim 9, wherein the thickness of the multilayer structure is in the range of 1 to 3000 μm.

14. A molded product produced by heat-stretching the multilayer structure according to claim 9.

15. The molded product according to claim 14, wherein the heat-stretching is performed by stretching the multilayer structure and being forced to take a contour of a mold.

16. The molded product according to claim 15, wherein the heat-stretching is performed at a drawing ratio of 0.1 to 3.

* * * * *